(12) United States Patent
Ito et al.

(10) Patent No.: US 12,113,414 B2
(45) Date of Patent: Oct. 8, 2024

(54) STATOR COIL AND ROTATING ELECTRIC MACHINE STATOR

(71) Applicant: Mitsubishi Electric Corporation, Tokyo (JP)

(72) Inventors: Yohei Ito, Tokyo (JP); Sohei Samejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 238 days.

(21) Appl. No.: 17/913,880

(22) PCT Filed: Apr. 27, 2020

(86) PCT No.: PCT/JP2020/017891
§ 371 (c)(1),
(2) Date: Sep. 23, 2022

(87) PCT Pub. No.: WO2021/220322
PCT Pub. Date: Nov. 4, 2021

(65) Prior Publication Data
US 2023/0117799 A1  Apr. 20, 2023

(51) Int. Cl.
*H02K 3/28* (2006.01)
(52) U.S. Cl.
CPC ..................................... *H02K 3/28* (2013.01)
(58) Field of Classification Search
CPC ............... H02K 3/04; H02K 3/12; H02K 3/28
See application file for complete search history.

(56) References Cited

U.S. PATENT DOCUMENTS

| 2003/0015932 | A1 | 1/2003 | Oohashi et al. |
| 2003/0164656 | A1 | 9/2003 | Sakurai |

FOREIGN PATENT DOCUMENTS

| CA | 2262619 C | 1/2005 |
| JP | 2000-515360 A | 11/2000 |
| JP | 2003-32933 A | 1/2003 |
| JP | 2003-259584 A | 9/2003 |
| JP | 2005-137057 A | 5/2005 |
| JP | 2010-41753 A | 2/2010 |
| JP | 2011-120356 A | 6/2011 |

OTHER PUBLICATIONS

International Search Report and Written Opinion mailed on Aug. 11, 2020, received for PCT Application PCT/JP2020/017891, filed on Apr. 27, 2020, 9 pages including English Translation.

*Primary Examiner* — Ramon M Barrera
(74) *Attorney, Agent, or Firm* — XSENSUS LLP

(57) ABSTRACT

A stator coil mounted to a rotating electric machine stator core includes a plurality of coil conductors. A thickness in a radial direction at coil end portions of the coil conductors provided on at least one end surface side in an axial direction of the stator core is equal to a thickness in the radial direction of slot insert portions of the coil conductors to be inserted into slots of the stator core. A width in a circumferential direction of the coil conductors at ends in the circumferential direction of the coil end portions is greater than a width in the circumferential direction of the coil conductors at the slot insert portions.

20 Claims, 14 Drawing Sheets

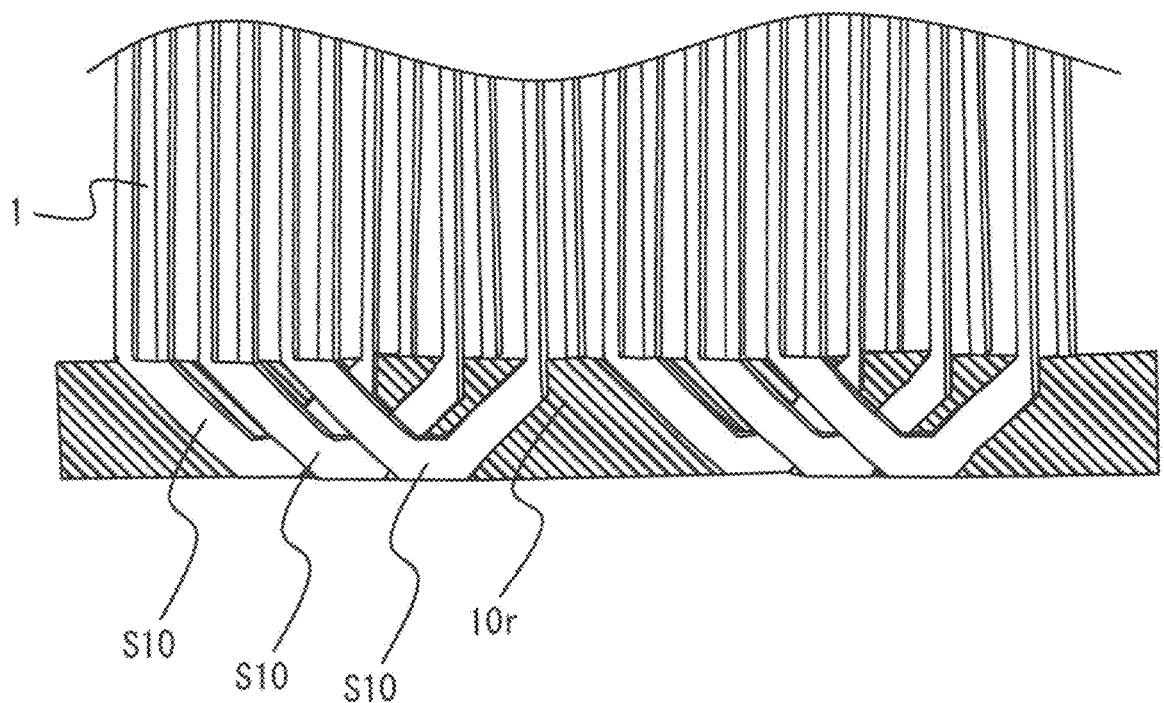

STATOR COIL AND ROTATING ELECTRIC MACHINE STATOR

CROSS-REFERENCE TO RELATED APPLICATION

The present application is based on PCT filing PCT/JP2020/017891, filed Apr. 27, 2020, the entire contents of which are incorporated herein by reference.

TECHNICAL FIELD

The present disclosure relates to a stator coil and a rotating electric machine stator.

BACKGROUND ART

In recent years, motors are strongly required to be reduced in sire and increased in output. In order to achieve size reduction and output increase in a motor, it is necessary to increase the space factor of conductors inserted in a stator and reduce copper loss. Conventionally, in a case where the sectional areas of conductors of a stator coil are the same among all the windings, the sectional shape of a coil end portion is the same as the sectional shape of a coil part inserted in a slot, and therefore it is difficult to reduce the resistance of the coil end portion without changing the length of the coil end portion.

Accordingly, Patent Document 1 discloses a feature that, for a conductor to be used for a coil of a stator core in a rotating electric machine, a part to be a slot insert portion is pressed in advance so as to take the sectional area thereof smaller than the sectional area of the original conductor, whereby the sectional area of a conductor part to be a coil end portion becomes larger than the sectional area of the part to be the slot insert portion.

CITATION LIST

Patent Document

Patent Document 1: Japanese Laid-Open Patent Publication No. 2003-32933

SUMMARY OF THE INVENTION

Problems to be Solved by the Invention

If the sectional area of a conductor forming a coil is reduced, the resistance increases so that copper loss increases. As in Patent Document 1, if the sectional, area of a conductor of a coil end portion is enlarged, copper loss at this part can be reduced. Meanwhile, there is difficulty in enlarging the sectional area of this part because of constraints on the space in the circumferential direction between adjacent conductors at the coil end portions, and therefore it is difficult to increase the difference between the sectional areas of this part and the slot insert portion.

The present disclosure has been made to solve the above problem, and an object of the present disclosure is to provide a stator coil and a rotating electric machine stator in which, while coil end portions are prevented from interfering with each other, the sectional area of a conductor at a coil end portion is made larger than the sectional area of a conductor at a slot insert portion, thereby reducing copper loss.

Solution to the Problems

A stator coil according to the present disclosure is a stator coil to be mounted to a rotating electric machine stator core including an annular yoke portion, a plurality of tooth portions protruding inward in a radial direction from an inner circumferential surface of the yoke portion and arranged at regular intervals in a circumferential direction, and a plurality of slots formed between the tooth portions adjacent to each other, the stator coil including a plurality of coil conductors. A thickness in the radial direction at a coil end portion of each coil conductor provided on at least one end surface side in an axial direction of the stator core is equal to a thickness in the radial direction of a slot insert portion of the coil conductor to be inserted into the slot of the stator core. A width in the circumferential direction of each coil conductor at an end in the circumferential direction of the coil end portion is greater than a width in the circumferential direction of the coil conductor at the slot insert portion.

A rotating electric machine stator according to the present disclosure includes: a rotating electric machine stator core including an annular yoke portion, a plurality of tooth portions protruding inward in a radial direction from an inner circumferential surface of the yoke portion and arranged at regular intervals in a circumferential direction, and a plurality of slots formed between the tooth portions adjacent to each other; and the above stator coil.

Effect of the Invention

In the stator coil and the rotating electric machine stator according to the present disclosure, while coil end portions are prevented from interfering with each other, the sectional area of a conductor at a coil end portion is made larger than the sectional area of a conductor at a slot insert portion, thus making it possible to provide a stator coil and a rotating electric machine stator in which copper loss is reduced.

BRIEF DESCRIPTION OF THE DRAWINGS

FIG. 14 is a schematic sectional view showing the structure of a stator to which a stator coil formed by combining a plurality of stacked segment coil conductors is mounted, according to embodiment 3.

DESCRIPTION OF EMBODIMENTS

Embodiment

Hereinafter, a stator coil and a rotating electric machine stator according to embodiment 1 will be described with reference to the drawings.

As used herein, when "axial direction", "circumferential direction", "radial direction", "inner circumferential side", and "outer circumferential side" are mentioned, they refer to an "axial direction", a "circumferential direction", a "radial direction", an "inner circumferential side", and an "outer circumferential side" of the stator coil, respectively, unless otherwise specified.

Figure 1:
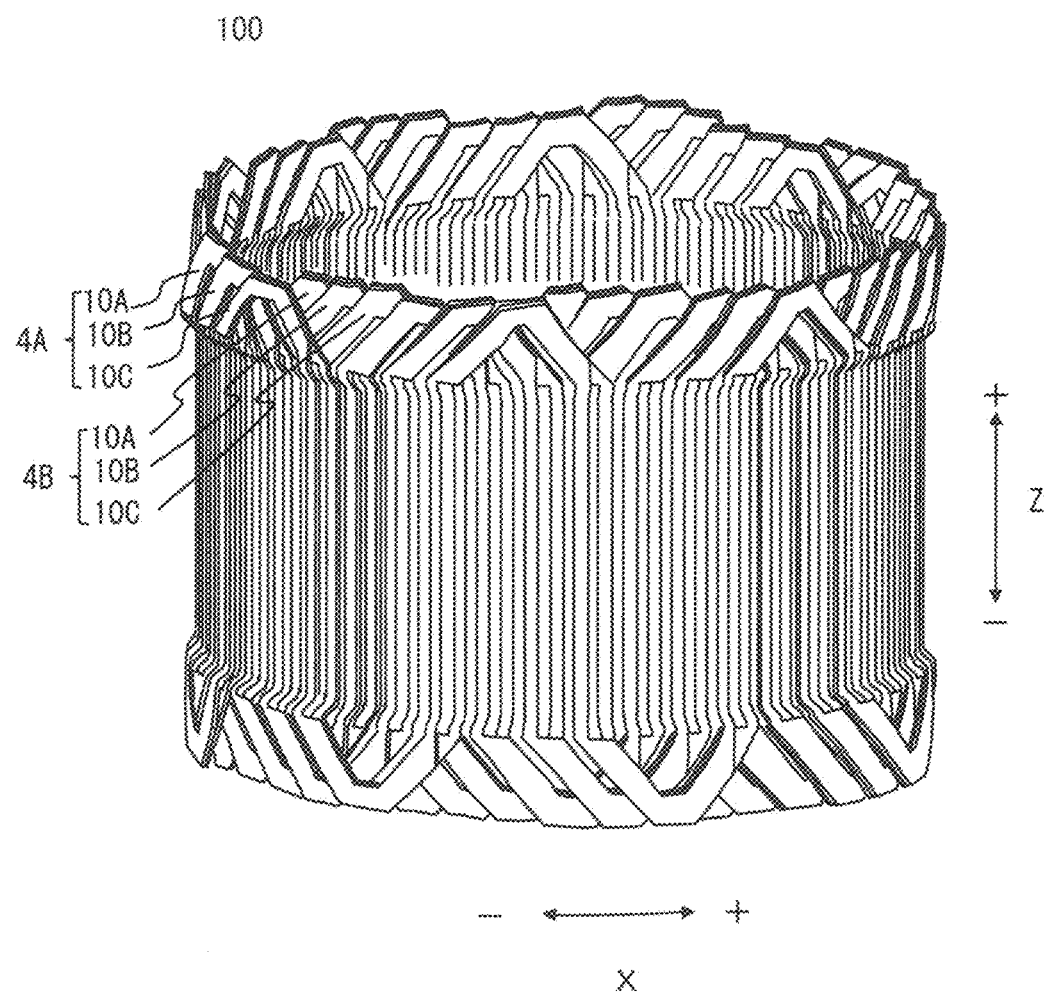
FIG. 1 is a perspective view showing the structure of a stator coil according to embodiment 1.

FIG. 1 is a perspective view showing the structure of a stator coil 100. In FIG. 1, not all of used coil conductors are shown.

Figure 2:
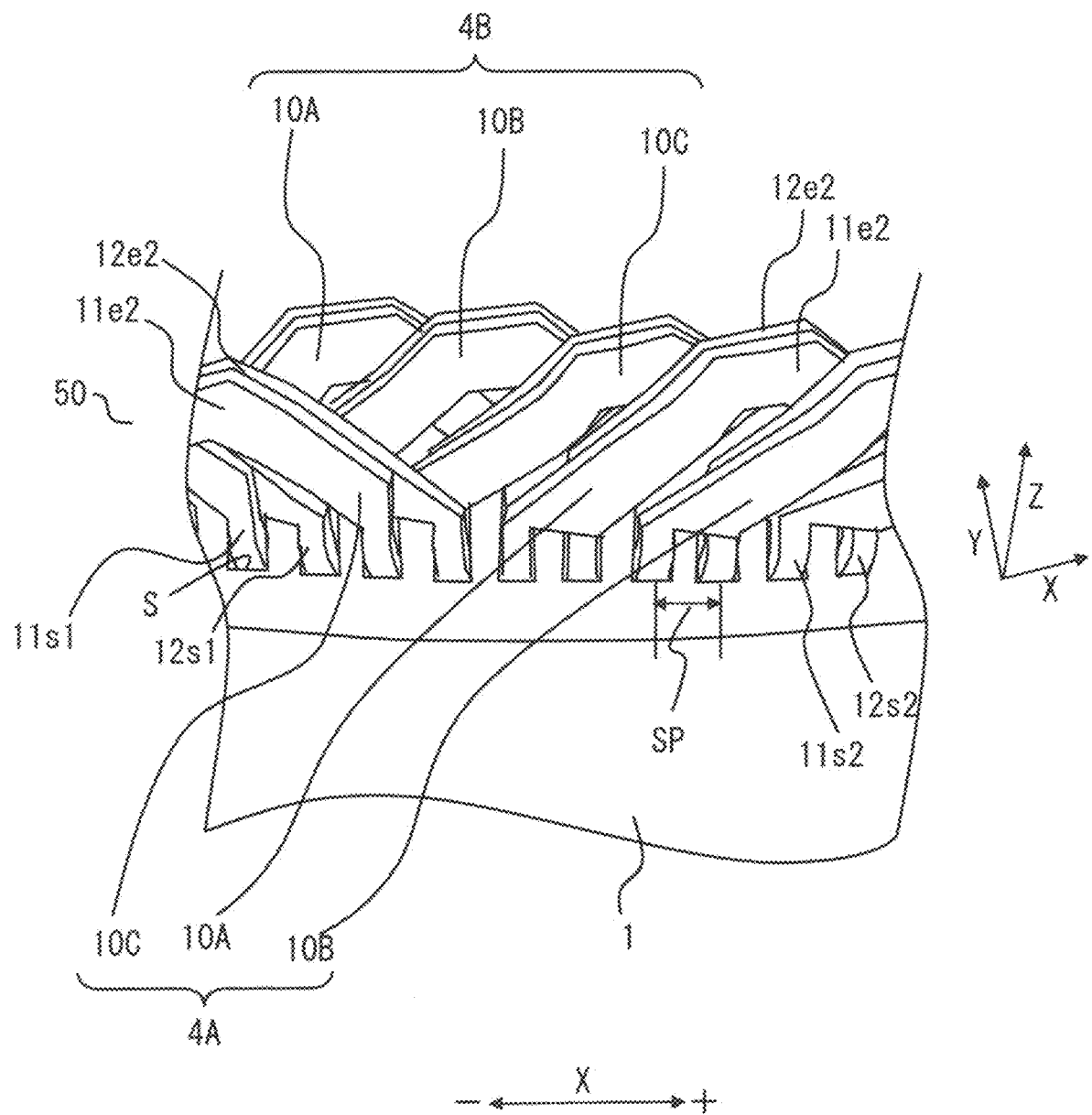
FIG. 2 is an enlarged view of a specific part of a stator in which the stator coil according to embodiment 1 is mounted to a stator core.

FIG. 2 is an enlarged view of a specific part of a stator 50 in which the stator coil 100 is mounted to a stator core 1. In FIG. 2, not all of used coil conductors are shown.

Figure 3:
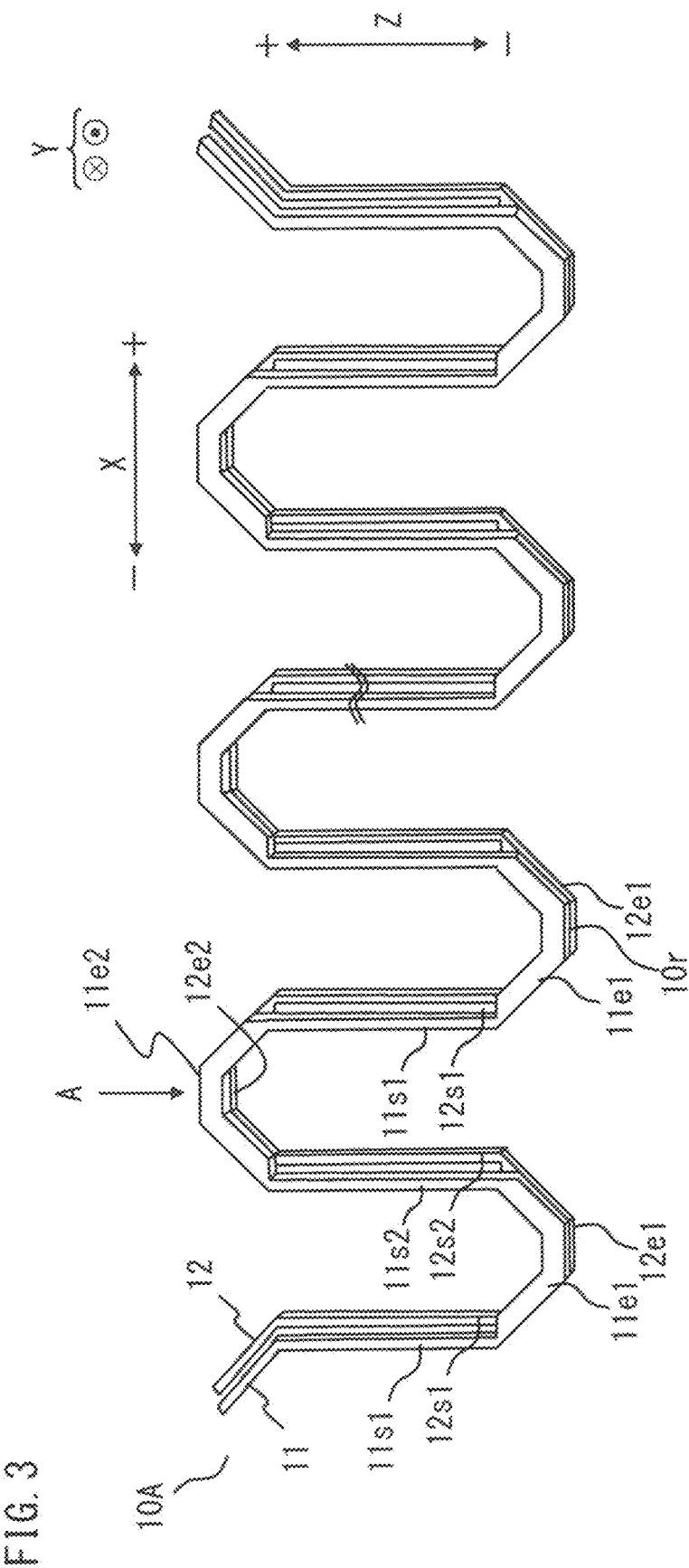
FIG. 3 is a perspective view showing the structure of a stacked coil conductor formed by combining a first coil conductor and a second coil conductor according to embodiment 1.

FIG. 3 is a perspective view showing the structure of a stacked coil conductor 10A.

Figure 4:
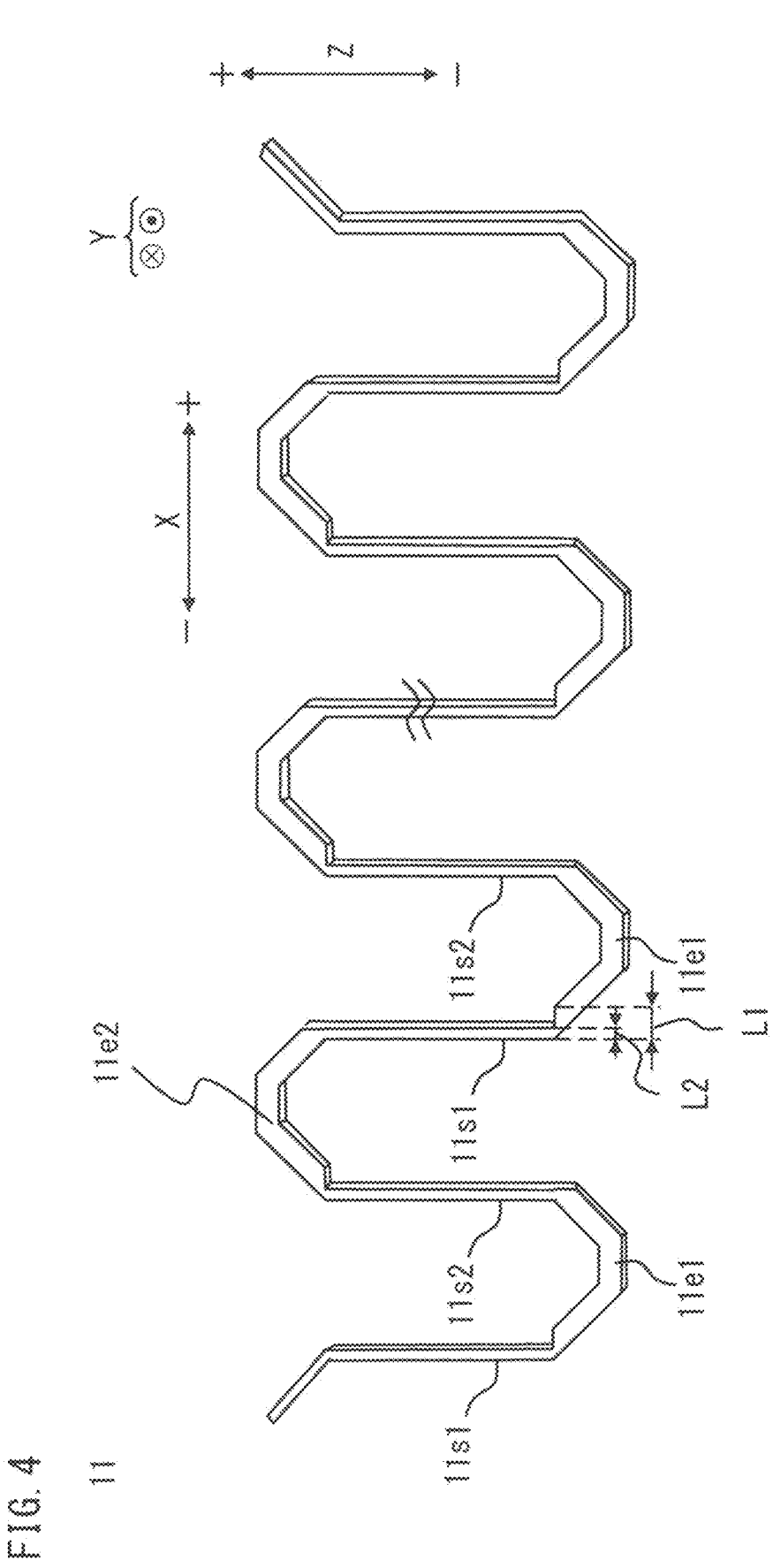
FIG. 4 is a perspective view showing the structure of the first coil conductor composing the stacked coil conductor according to embodiment 1.

FIG. 4 is a perspective view showing the structure of a first coil conductor 11 composing the stacked coil conductor 10A.

Figure 5:
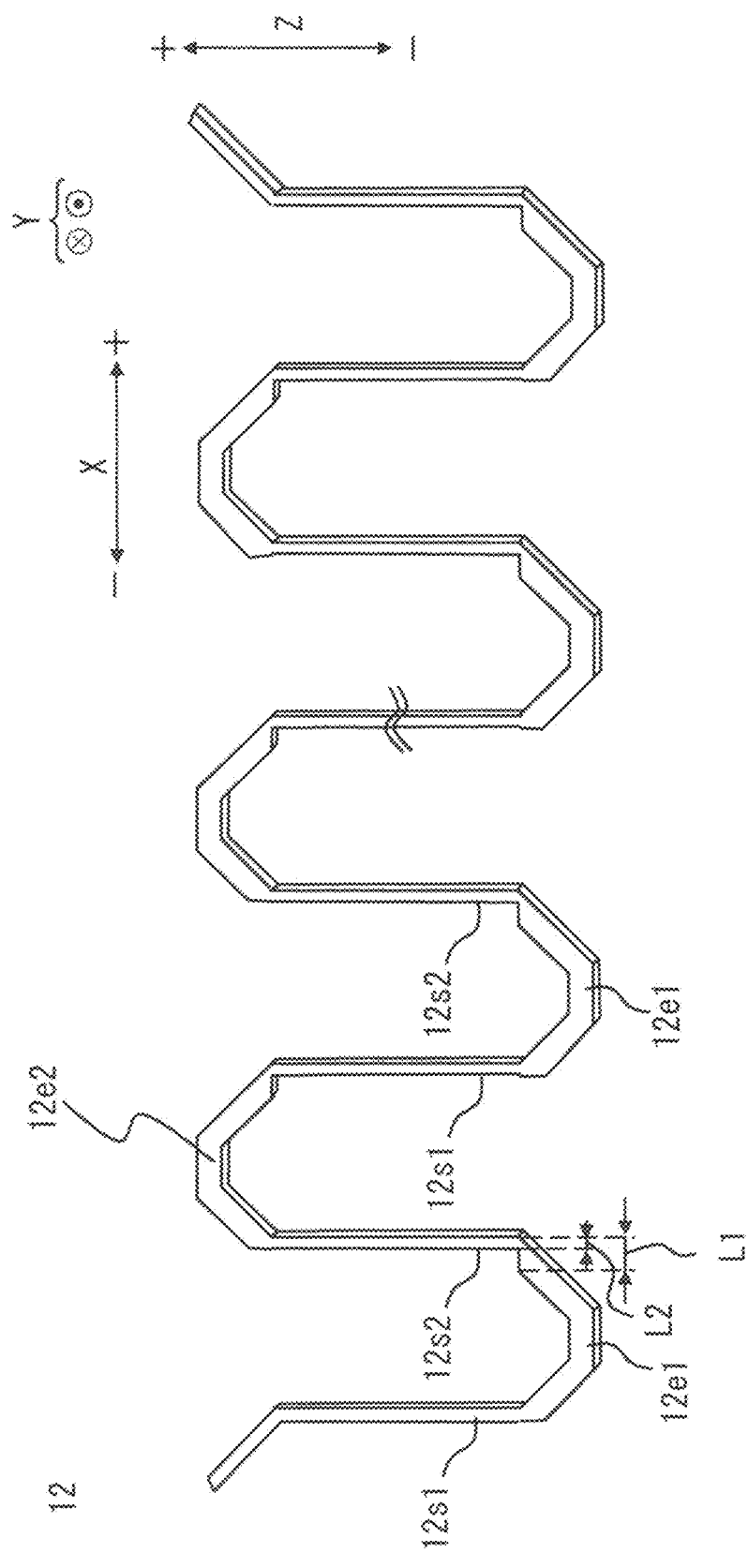
FIG. 5 is a perspective view snowing the structure of the second coil conductor composing the stacked coil conductor according to embodiment 1.

FIG. 5 is a perspective view showing the structure of a second coil conductor 12 composing the stacked coil conductor 10A.

Figure 6:
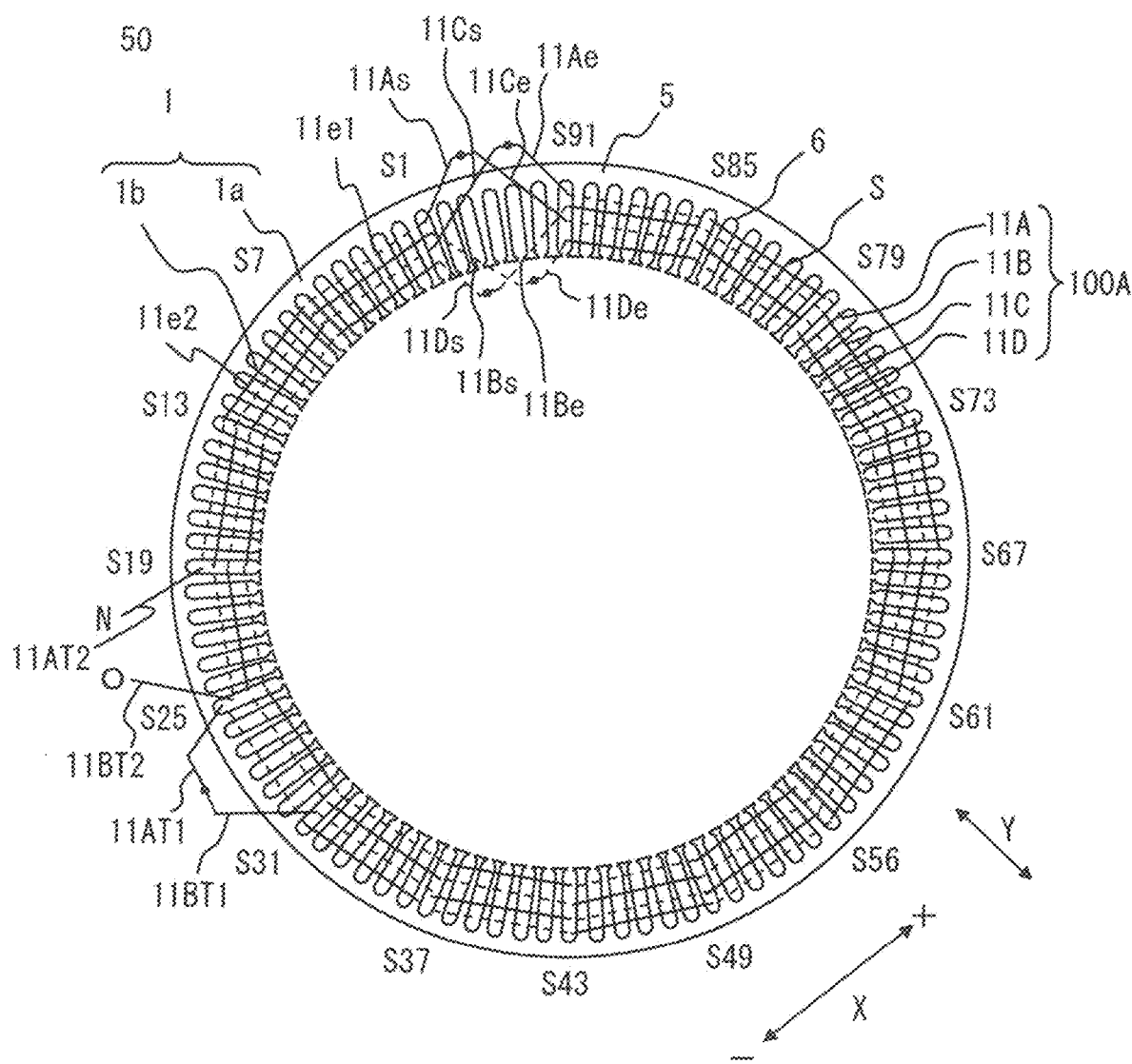
FIG. 6 is a schematic plan view showing the stator core to which the stator coil according to embodiment 1 is to be mounted, and a part of wiring arrangement.

FIG. 6 is a schematic plan view showing the stator core 1 to which the stator coil 100 is to be mounted, and a part of wiring arrangement.

As shown in FIG. 6, the rotating electric machine stator 50 includes the stator core 1 having an annular shape, and the stator coil 100 (a part of which is denoted by 100A) composed of a plurality of first coil conductors 11 (the details will be described later) and a plurality of second coil conductors 12 to be inserted into slots S of the stator core 1.

The stator core 1 includes an annular yoke portion 1a, and ninety-six tooth portions 1b protruding inward in the radial direction from the inner circumferential surface of the yoke portion 1a and arranged at regular intervals in the circumferential direction. Grooves formed between the adjacent tooth portions 1b and extending in the axial direction are the slots S. Four slot insert portions of the stator coil 100 described later are inserted into each slot S.

The stator coil 100 is composed of four combination coils 4A, 4B, 4C, 4D. Among these, only the combination coils 4A, 4B are shown in FIG. 1 and FIG. 2. In actuality, on the inner side of the combination coil 4B, the combination coil 4C having the same shape as the combination coil 4A and having a slightly smaller inner diameter is provided, and further on the inner side thereof, the combination coil 4D having the same shape as the combination coil 4B and having a slightly smaller inner diameter is provided. As shown in FIG. 2, each of the combination coils 4A to 4D is composed of three stacked coil conductors 10A, 10B, 10C.

The stacked coil conductors 10A, 10B, 10C are different in that the coil end portions thereof are arranged so as to be shifted from each other by six slots in the circumferential direction X, while their coil structures are the same. That is, for example, the coil end portions of the combination coil 4B are shifted from the coil end portions of the combination coil 4A by six slots toward the circumferential direction X+ side.

Next, the stacked coil conductors 10A to 10C, and the first coil conductors 11 and the second coil conductors 12 composing the stacked coil conductors 10A to 10C, will be described using the stacked coil conductor 10A as an example, with reference to FIG. 3, FIG. 4, and FIG. 5. In FIG. 3, FIG. 4, and FIG. 5, the left-right direction on the drawing sheet is the circumferential direction X. For convenience sake, the right side on the drawing sheet is defined as + side (one side), and the left side on the drawing sheet is defined as − side (other side). In addition, a direction from the near side toward the deep side of the drawing sheet and a direction opposite thereto are defined as radial direction Y. In addition, the up-down direction on the drawing sheet is defined as axial direction Z. For convenience sake, the upper side on the drawing sheet is defined as + side (one end side), and the lower side on the drawing sheet is defined as − side (other end side).

As shown in FIG. 3, the stacked coil conductor 10A is formed by a combination of the first coil conductor 11 and the second coil conductor 12 stacked in the radial direction Y.

As shown in FIG. 4, the first coil conductor 11 has slot insert portions $11s1$, $11s2$ to be inserted into the stator core 1, and coil end portions $11e1$, $11e2$ connecting the ends on the one end side in the axial direction Z of the slot insert portions $11s1$, $11s2$ to each other, and the ends thereof on the other end side to each other, alternately and continuously.

In FIG. 4, the end on the axial direction Z− side of the slot insert portion $11s1$ on the endmost circumferential direction X− side is continuously connected to the end on the circumferential direction X− side of the coil end portion $11e1$, which is present on the endmost circumferential direction X− side and extends towards the axial direction Z+ side. Then, the end on the circumferential direction X+ side of the coil end portion $11e1$ is continuously connected to the end on the axial direction Z− side of the next slot insert portion $11s2$ to be inserted into the slot S away by six slots toward the circumferential direction X+ side.

The end on the axial direction Z+ side of the slot insert portion $11s2$ is continuously connected to the end on the circumferential direction X− side of the next coil end portion $11e2$ extending toward the circumferential direction X+ side. Then, the end on the circumferential direction X+ side of the coil end portion $11e2$ is continuously connected to the end on the axial direction Z+ side of the next slot insert portion $11s1$ to be inserted into the slot S away by six slots toward the circumferential direction X+ side. In this way, the first coil conductor 11 is formed such that the slot insert portions $11s1$, $11s2$ and the coil end portions $11e1$, $11e2$ are connected alternately and continuously. That is, the slot insert portions list, $11s2$ are continuously connected so as to turn back alternately in the axial direction Z via the coil end portions $11e1$, $11e2$ arranged alternately at both end surfaces in the axial direction Z of the stator core 1.

Similarly, as shown in FIG. 5, the second coil conductor 12 has slot insert portions $12s1$, $12s2$ to be inserted into the stator core 1, and coil end portions $12e1$, $12e2$ connecting the ends on one end side in the axial direction Z of the slot insert portions 12s1, 12s2 to each other and the ends thereof on the other end side to each other, alternately and continuously.

In FIG. 5, the end on the axial direction Z− side of the slot insert portion 12s1 on the endmost circumferential direction X− side is continuously connected to the end on the circumferential direction X− side of the coil end portion 12e1, which is present on the endmost circumferential direction X− side and extends toward the axial direction Z+ side. Then, the end on the circumferential direction X+ side of the coil end portion 12e1 is continuously connected to the end on the axial direction Z− side of the next slot insert port ion 12s2 to be inserted into the slot S away by 6 slots toward the circumferential direction X+ side.

Then, the end on the axial direction Z+ side of the slot insert portion 12s2 is continuously connected to the end on the circumferential direction X− side of the next coil end portion 12e2 extending toward the circumferential direction X+ side. Then, the end on the circumferential direction X+ side of the coil end portion 12e2 is continuously connected to the end on the axial direction Z+ side of the next slot insert portion 12s1 to be inserted into the slot S away by six slots toward the circumferential direction X+ side. In this way, the second coil conductor 12 is formed such that the slot insert portions 12s1, 12s2 and the coil end portions 12e1, 12e2 are connected alternately and continuously. That is, the slot insert portions 12s1, 12s2 are continuously connected so as to turn back alternately in the axial direction Z via the coil end portions 12e1, 12e2 arranged alternately at both end surfaces in the axial direction Z of the stator core 1.

The first coil conductor 11 and the second coil conductor 12 formed as described above are stacked so as to be overlapped in the radial direction Y as shown in FIG. 3, thus forming the stacked coil conductor 10A. The structures of the stacked coil conductors 10B, 10C are the same as that of the stacked coil conductor 10A. The stacked coil conductors 10A to 10C are combined so as to be shifted from each other in the circumferential direction X and mounted to the stator core 1 as shown in FIG. 2. Between the coil end portion 11e1 of the first coil conductor 11 and the coil end portion 12e1 of the second coil conductor 12, their center parts in the circumferential direction X perfectly overlap each other as seen in the radial direction Y, and the shapes are different only on both sides in the circumferential direction X. The same applies to the coil end portion 11e2 and the coil end portion 12e2.

On the other hand, the slot insert portion 11s1 of the first coil conductor 11 and the slot insert portion 12s1 of the second coil conductor 12 are shifted from each other toward one side in the circumferential direction X by one slot S as seen in the radial direction Y. That is, the slot insert portion 11s1 of the first coil conductor 11 and the slot insert portion 12s1 of the second coil conductor 12 are inserted one by one into the adjacent slots S, and in a state of being mounted to the stator core 1, one tooth portion 1b is present between the slot insert portions 11s1, 12s1. The same applies to the relationship between the slot insert portion 11s2 of the first coil conductor and the slot insert portion 12s2 of the second coil conductor 12. The first coil conductor 11 and the second coil conductor 12 are coated with insulating materials (not shown).

The coil end portion 11e1 of the first coil conductor 11 and the coil end portion 12e1 of the second coil conductor 12 may be joined via an insulator 10r. As the insulator 10r, insulating paper, fiber reinforced plastic, a resin film, an adhesive sheet, or the like may be used. These materials may be used in combination. The same applies to the coil end portion 11e2 of the first coil conductor 11 and the coil end portion 12e2 of the second coil conductor 12. The structures of the combination coils 4B to 4D are the same as that of the combination coil 4A except for differences in inner diameters in a state of being mounted to the stator core 1.

Figure 7:
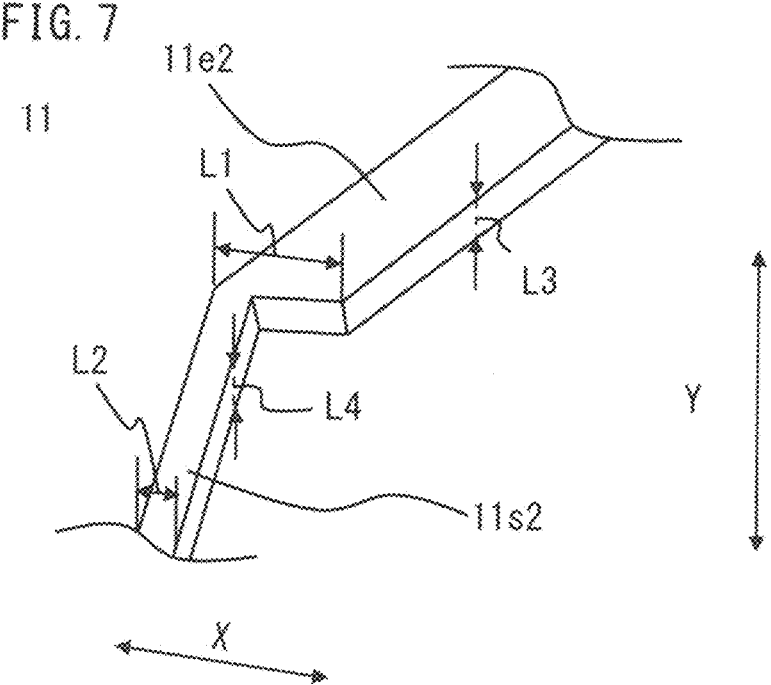
FIG. 7 is an enlarged view showing a part around the boundary between a slot insert portion and a coil end portion of the first coil conductor shown in FIG. 4.

FIG. 7 is an enlarged view showing a part around the boundary between the slot insert portion 11s2 and the coil end portion 11e2 of the first coil conductor 11 shown in FIG. 4.

As shown in FIG. 2, FIG. 4, and FIG. 7, a width L1 in the circumferential direction X of the first coil conductor 11 at the end on the circumferential direction X− side of the coil end portion 11e2 is equal to the sum of a pitch SP in the circumferential direction X of the slots S and a width L2 in the circumferential direction X of the slot insert portion 11s2 of the first coil conductor 11. The − side part in the circumferential direction X of this end is connected to the slot insert portion 11s2 having a smaller width in the circumferential direction X. The same applies to the boundary between the slot insert portion 11s1 and the coil end portion 11e1 of the first coil conductor 11.

The width in the circumferential direction X of the first coil conductor 11 at the end on the circumferential direction X side of the coil end portion 11e2 is gradually reduced to be equal to the width in the circumferential direction X of the slot insert portion 11s1. A thickness L3 in the radial direction Y of the coil end portions 11e1, 11e2 of the first coil conductor 11 is equal to a thickness L4 in the radial direction Y of the slot insert portions 11s1, 11s2 of the first coil conductor 11. Therefore, the sectional areas in the direction perpendicular to the longitudinal direction of the coil end portions 11e1, 11e2 of the first coil conductor 11 are larger than the sectional areas in the direction perpendicular to the longitudinal direction of the slot insert portions 11s1, 11s2. Thus, the electric resistance of the coil end portions 11e1, 11e2 is reduced, whereby copper loss of the first coil conductor 11 can be reduced.

In addition, a width L1 in the circumferential direction X of the second coil conductor 12 at the end on the circumferential direction X+ side of the coil end portion 12e2 is equal to the sum of the pitch SP in the circumferential direction X of the slots S and a width L2 of the slot insert portion 12s1 of the second roll conductor 12. The + side part in the circumferential direction X of this end is connected to the slot insert portion 12s1 having a smaller width in the circumferential direction X. The same applies to the boundary between the slot insert portion 12s2 and the coil end portion 12e1 of the second coil conductor 12.

The width in the circumferential direction X of the second coil conductor 12 at the end on the circumferential direction X− side of the coil end portion 12e2 is gradually reduced to be equal to the width in the circumferential direction X of the slot insert portion 12s2. A thickness L3 in the radial direction Y of the coil end portions 12e1, 12e2 of the second coil conductor 12 is equal to a thickness L4 in the radial direction Y of the slot insert portions 12s1, 12s2 of the second coil conductor 12. Therefore, the sectional areas in the direction perpendicular to the longitudinal direction of the coil end portions 12e1, 12e2 of the second coil conductor 12 are larger than the sectional areas in the direction perpendicular to the longitudinal direction of the slot insert portions 12s1, 12s2. Thus, the electric resistance of the oil end portions 12e1, 12e2 is reduced, whereby copper less of the second coil conductor 12 can be reduced.

As described above, the slot insert portion 11s1 of the first coil conductor 11 and the slot insert portion 12s1 of the second coil conductor 12 are respectively inserted into the slots S adjacent to each other in the circumferential direction X, and the slot insert portion 11s2 of the first coil conductor 11 and the slot insert portion 12s2 of the second coil conductor 12 are also inserted into the slots S adjacent to each other in the circumferential direction X. That is, the slot insert portion 11s1 of the first coil conductor 11 and the slot insert portion 12s1 of the second cell conductor 12 are arranged such that the center line of the slot insert portion 11s1 and the center line of the slot insert portion 12s1 are distant from each other by a one-slot pitch in the circumferential direction X, and the tooth portion 1b is present therebetween in the circumferential direction X. The same applies to the relationship between the slot insert portion 11s2 of the first coil conductor 11 and the slot insert portion 12s2 of the second coil conductor 12.

The slot insert portion 11s1 of the first coil conductor 11 and the coil end portion 12e2 of the second coil conductor 12 are offset from each other the radial direction Y and thus do not come into contact with each other. Similarly, the slot insert portion 11s2 of the first coil conductor 11 and the coil end portion 12e1 of the second coil conductor 12 are offset from each other in the radial direction Y and thus do not come into contact with each other.

Figure 8:
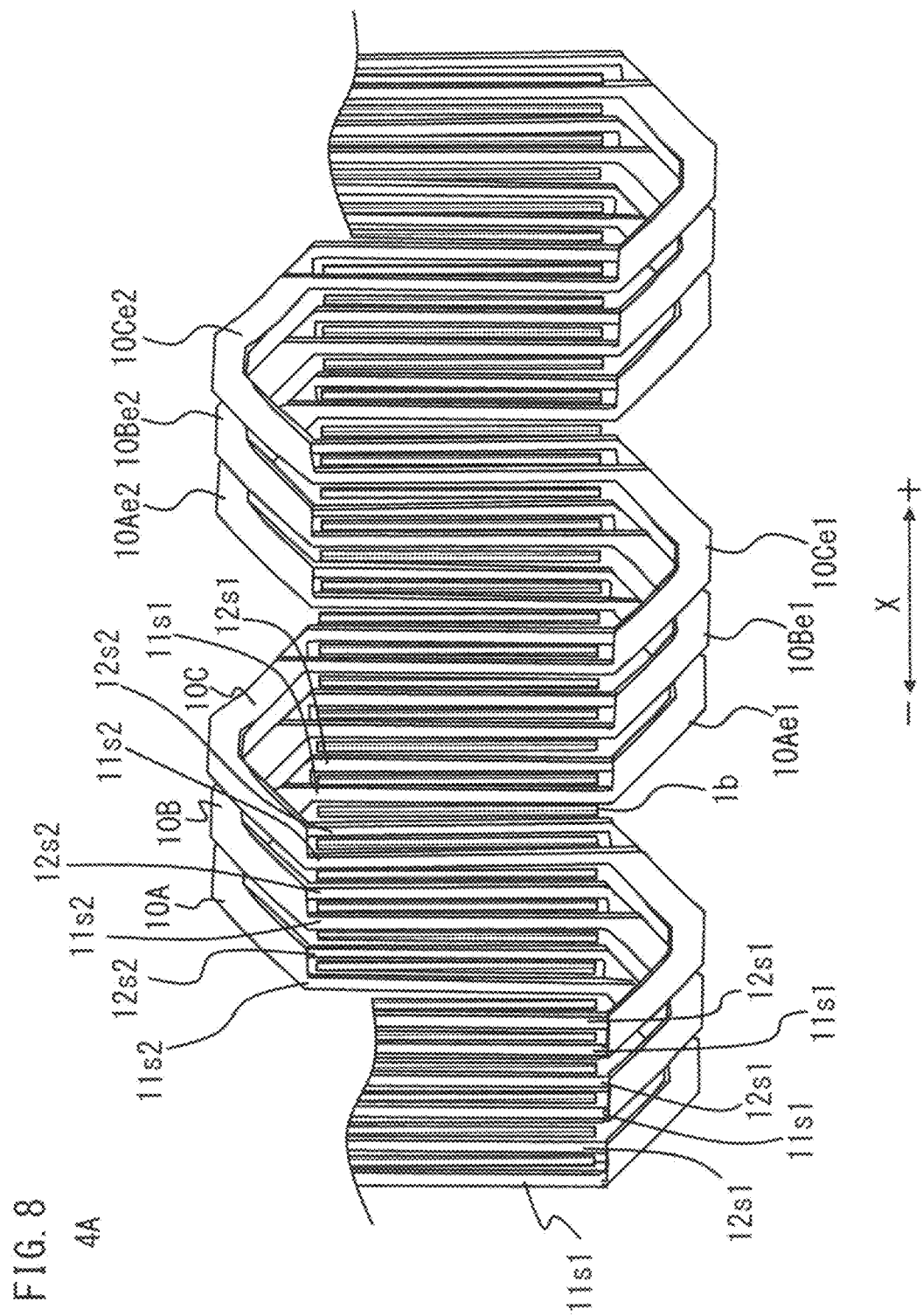
FIG. 8 is a schematic view of a combination coil formed by combining three stacked coil conductors according to embodiment 1, as seen from the outer circumferential side.

FIG. 8 is a schematic view of the combination coil 4A formed by combining three stacked coil conductors 10A, 10B, 10C, as seen from the outer circumferential side. For convenience sake in illustrating the entire structure, the combination coil 4A is drawn in a plane shape. In addition, the tooth portion 1b is shown but this cannot be seen in actuality.

Figure 9:
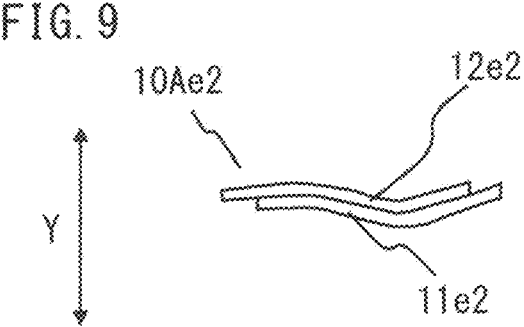
FIG. 9 is a view of the stacked coil conductor as seen in the direction of arrow A (axial direction) shown in FIG. 3.

FIG. 9 is a view of the stacked coil conductor 10A as seen in the direction of arrow A (axis direction Z) shown in FIG. 3.

Two slot insert portions 11s1, 11s2 of the first coil conductor 11 of the stacked coil conductor 10A composing the combination coil 4A are respectively inserted in the slots S away from each other by six slots in the circumferential direction X. Two slot insert portions 12s1, 12s2 of the second coil conductor 12 integrated with the first coil conductor 11 are respectively inserted in the slots S on the circumferential direction X+ side adjacent to the slots S in which the slot insert portions 11s1, 11s2 of the first coil conductor 11 are inserted.

The slot insert portions 11s1 to 12S2 of the stacked coil conductor 10B composing the combination coil 4A are inserted in the slots S away toward the circumferential direction X+ side by two slots respectively from the slots S in which the slot insert portions 11s1 to 12s2 of the stacked coil conductor 10A composing the combination coil 4A are inserted, and the slot insert portions 11s1 to 12S2 of the stacked coil conductor 10C composing the combination coil 4A are inserted in the slots S further away therefrom by two slots respectively toward the circumferential direction X+ side.

As described above, in the present embodiment, one combination coil 4A is formed by combining the three stacked coil conductors 10A to 10C. In combining the stacked coil conductors 10A, 105, 10C, in order to prevent stacked coil end portions 10Ae1, 10Be1, 10Ce1 of the stacked coil conductors 10A to 10C from interfering with each other, it is necessary to bend outermost extending parts (top parts) of the stacked coil end portions 10Ae1 to 10Ce1 so as to be offset in the radial direction Y by an amount corresponding to the thickness of the stacked coil conductor 10A. The reason therefor will be described below.

As shown in FIG. 1, FIG. 2, and FIG. 8, in a state of being inserted in the slots S of the stator core 1, the positions in the radial direction Y in the slot S where all the slot insert portions 11s1, 11s2, 12s1, 12s2 of the stacked coil conductors 10A to 10C composing the combination coil 4A are respectively inserted, are all the same in the respective slots S, i.e., the outermost positions in the radial direction Y. Similarly, the positrons in the radial direction Y in the slots S where all the slot insert portions 11s1, 11s2, 12s1, 12s2 of the stacked coil conductors 10A to 10C composing the combination coil 4B are respectively inserted, are all the same in the respective slots S, i.e., the second positions from the outermost side in the radial direction Y.

Here, as shown in FIG. 8, a stacked cool end portion 10Be2 of the stacked coil conductor 10B and a stacked coil end portion 10Ce2 of the stacked coil conductor 10C are present on the outer side in the radial direction Y of a stacked coil end portion 10Ae2 of the stacked coil conductor 10A. Therefore, in order to store all the slot insert portions 11s1, 11s2, 12s1, 12s2 composing the stacked coil conductor 10A at the same position in the radial direction Y, the stacked cool end portion 10Ae2 needs to be bent so as to be offset in the radial direction Y by an amount corresponding to the thickness in the radial direction Y of the stacked coil end portion 10Ae2, as shown in FIG. 9. The same applies to the stacked coil end portion 10Ae1, and also applies to the stacked coil end portions of the stacked coil conductors 10B, 10C.

Figure 10:
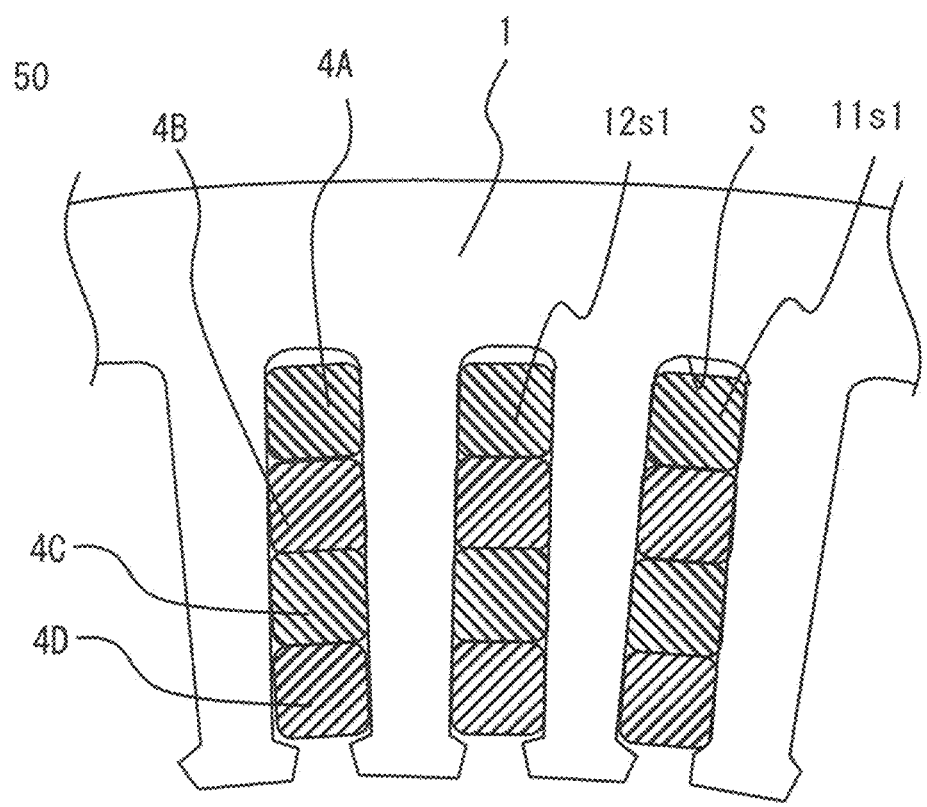
FIG. 10 is a sectional view along a direction perpendicular to the axial direction of the stator core with four combination coils inserted slots according to embodiment 1.

FIG. 10 is a sectional view along a direction perpendicular to the axial direction Z of the stator core 1 with the four combination coils 4A, 4B, 4C, 4D inserted in the slots S.

Since the coil end portions are bent in the radial direction Y as described above, the thicknesses in the radial direction Y of the coil end portions 11e1 to 12e2 (not the thickness in the radial direction Y of the conductor itself but the thickness in the radial direction of the entire stacked coil end portion 10Ae1, for example) are greater than the thicknesses in the radial direction Y of the slot insert portions. Therefore, in a case of inserting the slot insert portions 11s1 to 12s2 of the first coil conductors 11 and the second coil conductors 12 into the slots S while overlapping the combination coils 4A to 4D in the radial direction Y, if the slot insert portions 11s1 to 12s2 are to be placed in close contact with each other in the radial direction Y, for example, three stacked coil end portions 10Ae2 to 10Ce2 interfere with each other in the radial direction Y.

Therefore, by bending the coil end portions 11e1 to 12e2 in the radial direction Y from their bases as appropriate, interference between the coil end portions can be eliminated and the slot insert portions 11s1 to 12s2 can be placed densely as shown in FIG. 10. An insulator such as insulating paper (not shown) may be inserted between the inner wall surface of the slot S and each of the first coil conductors 11 and the second coil conductors 12.

Next, the winding structure of the stator coil 100 will be described.

As described above, the stator coil 100 of the stator 50 is composed of the four combination coils 4A, 4B, 4C, 4D. The structures of the combination coils 4A to 4D are all the same. Each of the combination coils 4A, 4B, 4C, 4D is composed of three stacked coil conductors 10A, 10B, 10C. Each of the stacked coil conductors 10A to 10C is formed by stacking and integrating the first coil conductor 11 and the second coil conductor 12.

The first coil conductors 11 of all (four) stacked coil conductors 10A composing the combination coils 4A to 4D form a coil group 100A for one phase.

The second coil conductors 12 of all stacked coil conductors 10A composing the combination coils 4A to 4D form a coil group for one phase.

The first coil conductors 11 of all stacked coil conductors 10B composing the combination coils 4A to 4D form a coil group for one phase.

The second coil conductors 12 of all stacked coil conductors 10B composing the combination coils 4A to 4D form a coil group for one phase.

The first coil conductors 11 of all stacked coil conductors 10C composing the combination coils 4A to 4D form a coil group for one phase.

The second coil conductors 12 of all stacked coil conductors 10C composing the combination coils 4A to 4D form a coil group for one phase.

Next, the coil group 100A for one phase formed by the first coil conductors 11 of all the stacked coil conductors 10A composing the combination coils 4A to 4D, will be described with reference to FIG. 6.

FIG. 6 shows only the coil group 100A for one phase formed by the four first coil conductors 11 of all (four) stacked coil conductors 10A composing the combination coils 4A to 4D, and the other coil conductors are not shown. An end surface on the axial direction Z+ side of the stator core 1 (a side seen in FIG. 6) is defined as a first end surface, and an end surface on the axial direction Z− side (a side not seen in FIG. 6) is defined as a second end surface. In FIG. 6, coil ends seen on one end side are drawn by solid lines, and coil ends that are present on the other end side and therefore are not seen are drawn by broken lines.

In FIG. 6, the first coil conductor 11 of the stacked coil conductor 10A composing the combination coil 4A is shown as a first coil conductor 11A, the first coil conductor 11 of the stacked coil conductor 10A composing the combination coil 4B is shown as a first coil conductor 11B, the first coil conductor 11 of the stacked coil conductor 10A composing the combination coil 4C is shown as a first coil conductor 11C, and the first coil conductor 11 of the stacked coil conductor 10A composing the combination coil 4D is shown as a first coil conductor 11D.

The four first coil conductors 11A to 11D are arranged in the order of the first coil conductor 11A, the first coil conductor 11B, the first coil conductor 11C, the first coil conductor 11D, from the outer side in the radial direction of the stator core 1. The slot insert portions 11$s$1, 11$s$2 of the first coil conductors 11A to 11D are inserted in the same slots Sn away from each other by six slots in the order from a slot S1 to a slot S91 of the stator core 1.

The coil end portion 11$e$1 connecting the end on the axial direction Z− side of the slot insert portion 11$s$1 of the first coil conductor 11A inserted at the outermost position in the radial direction Y in the slot S1 and the end on the axial direction Z− side of the slot insert portion 11$s$2 inserted at the outermost position in the radial direction Y in the slot S7, is formed on the second end surface side. The coil end portion 11$e$2 connecting the end on the axial direction Z+ side of the slot insert portion 11$s$2 inserted at the outermost position the radial direction Y in the slot S7 and the end on the axial direction Z+ side of the slot insert portion 11$s$1 inserted at the outermost position in the radial direction Y in the slot S13, is formed on the first end surface side. In this way, the coil end portion 11$e$1 and the coil end portion 11$e$2 are alternately formed on the second end surface side and the first end surface sloe of the stator core 1. The arrangement of the first coil conductor 11C inserted at the third position from the outer side the radial direction Y in the slot S1 is the same as the above arrangement of the first coil conductor 11A.

The arrangements of the first coil conductor 11B inserted at the second position and the first coil conductor 11D inserted at the fourth position from the outer side in the radial direction Y in the slot S1 are the same, but are different from the first coil conductor 11A in that the side where the coil end portions are formed is the opposite side in the axial direction Z.

At the first end surface of the stator core 1, a winding start end 11As of the first coil conductor 11A extending from the outermost side in the radial direction Y in the slot S1 and a winding finish end 11Ce of the first coil conductor 11C extending from the third position from the outer side in the radial direction Y in the slot S91 are joined to each other.

In addition, a winding start end 11Cs of the first coil conductor 11C extending from the third position from the outer side in the radial direct on Y in the slot S1 and a winding finish end 11Ae of the first coil conductor 11A extending from the outermost side in the radial direction Y in the slot S91 are joined to each other.

At the second end surface of the stator core 1, a winding start end 11Bs of the first coil conductor 11B extending from the second position from the cuter side in the radial direction Y in the slot S1 and a winding finish end 11De of the first coil conductor 11D extending from the fourth position from the outer side in the radial direction Y in the slot S91 are joined to each other.

In addition, a winding start end 11Ds of the first coil conductor 11D extending from the fourth position from the outer side in the radial direction Y in the slot S1 and a winding finish end 11Be of the first coil conductor 11B extending from the second position from the outer side in the radial direction Y in the slot S91 are joined to each other.

The coil end portion 11$e$2 of the first coil conductor 11A extending toward the first end surface side of the stator core 1 from the slot S19 and the slot S25 is cut, and the coil end portion 11$e$2 of the first coil conductor 11B extending toward the first end surface side of the stator core 1 from the slot S25 and the slot S31 is cut.

One cut portion 11BT1 of the first coil conductor 11B extending from the slot S31 and one cut portion 11AT1 of the first coil conductor 11A extending from the slot S25 are joined to each other, whereby the first coil conductor 11A to the first coil conductor 11D are connected in series, thus forming the coil group 100A for one phase with two turns made on a six-tooth-portion basis.

Another cut portion 11BT2 of the first coil conductor 11B extending from the slot S25 serves as a lead-out wire O, and another cut portion 11AT2 of the first coil conductor 11A extending from the slot S19 serves as a neutral point N.

Regarding the coil group for one phase formed by the second coil conductors 12 of all the stacked coil conductors 10A composing the combination coils 4A to 4D, the slot insert portions 12$s$1, 12$s$2 are inserted in the slots Sn away from each other by six slots in the circumferential direction X from the slot S2 to a slot S92 so as to be each shifted by one slot from the above slots.

Regarding the coil group for one phase formed by the first coil conductors 11 of all the stacked coil conductors 10B composing the combination coils 4A to 4D, the slot insert portions 11$s$1, 11$s$2 are inserted n the slots Sn away from each other try six slots in the circumferential direction X from the slot S3 to a slot S93 so as to be each shifted by one slot further from the above slots.

Regarding the coil group for one phase formed by the second coil conductors 12 of all the stacked coil conductors 10B composing the combination coils 4A to 4D, the slot insert portions 12$s$1, 12$s$2 are inserted in the slots Sn away from each other by six slots in the circumferential direction X from the slot S4 to a slot S94 so as to be each shifted by one slot further from the above slots.

Regarding the coil group for one phase formed by the first coil conductors 11 of all the stacked coil conductors 10C composing the combination coils 4A to 4D, the slot insert portions 11s1, 11s2 are inserted in the slots Sn away from each other by six slots in the circumferential direction X from the slot S5 to a slot S95 so as to be each shifted by one slot further from the above slots.

Regarding the coil group for one phase formed by the second coil conductors 12 of all the stacked coil conductors 10C composing the combination coils 4A to 4D, the slot insert portions 12s1, 12s2 are inserted in the slots Sn away from each other by six slots in the circumferential direction X from the slot S6 to a slot S96 so as to be shifted by one slot further from the above slots.

The coil group 100A wound through the slots Sn away from each other by six slots from the slot S1 to the S91, the coil group wound through the slots Sn away from each other by six slots from the slot S3 to the slot S93, and the coil group wound through the slots Sn away from each other by six slots from the slot S5 to the slot S95, are Y-connected with their neutral points (N) joined to each other. The coil group wound through the slots Sn away from each other by six slots from the slot S2 to the slot S92, the coil group wound through the slots Sn away from each other by six slots from the slot S4 to the slot S94, and the coil group wound through the slots Sn away from each other by six slots from the slot S6 to the slot S96, are Y-connected with their neutral points (N) joined to each other. Thus, the stator coil 10C composed of two pairs of three-phase AC coil groups is formed.

It is noted that the winding start ends, the winding finish ends, and the connection portions of the stator coil 100 are separated from the structure where the coil conductors are stacked with insulators therebetween, and thus are present as coil conductors alone. At the time of joining, insulating coats on the parts to be joined to each other are removed.

In the stator coil 100 and the rotating electric machine stator 50 according to embodiment 1, while the coil end portions are prevented from interfering with each other, the sectional area of the conductor at the coil end portion is made larger than the sectional area of the conductor at the slot insert portion, thus making it possible to provide a stator coil and a rotating electric machine stator in which copper loss is reduced.

In addition, two coil conductors having pluralities of slot insert portions inserted into slots adjacent to each other in the circumferential direction are formed as a stacked coil conductor with their coil end portions overlapped in the radial direction, whereby the conductor width on the coil end portion side at the connection part between the coil end portion and the slot insert portion can be enlarged to a width including the circumferential-direction width of the adjacent slot and thus copper loss of the stator coil can be reduced.

In the present embodiment 1, the slot insert portions of the first coil conductor 11 and the second coil conductor 12 are inserted in the slots S away from each other by six slots. However, the insertion slots are not limited to the slots S away from each other by six slots.

Embodiment 2

Hereinafter, a stator coil and a rotating electric machine stator according to embodiment 2 will be described with reference to the drawings, focusing on difference from embodiment 1.

Figure 11:
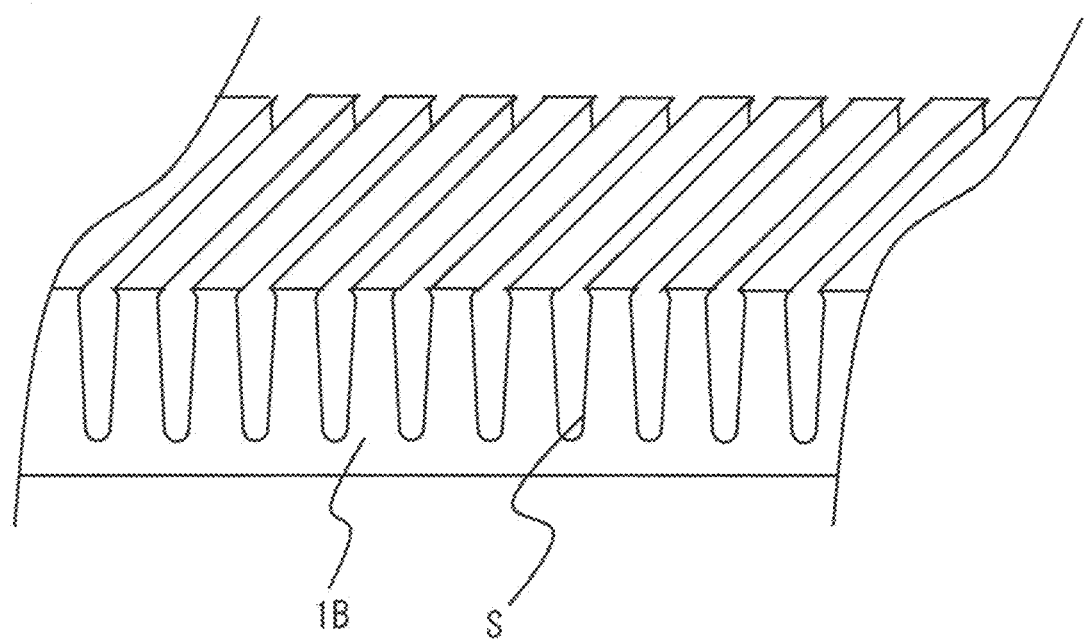
FIG. 11 is a perspective view showing another example of a stator core according to embodiment 2.

FIG. 11 is a perspective view showing an example of a band-shaped stator core 1B.

In embodiment 1, the case of using the annular stator core 1 has peen described. Alternatively, the stator 50 having the three-phase AC stator coil 100 can be manufactured by, as shown in FIG. 11, sequentially fitting the combination coils 4A to 4D into the stator core 1B, bending the stator core 1B into an annular shape the state in which the combination coils 4A to 4D are fitted into the stator core 1B, joining both ends of the stator core 1B to each other, and then connecting the combination coils 4A to 4D as appropriate. As a matter of course, the manufacturing method is not limited to such a method.

Embodiment

Hereinafter, a stator coil and a rotating electric machine stator according to embodiment 3 will be described with reference to the drawings, focusing on difference from embodiment 1.

In embodiment 1, the case of using the first coil conductor 11 and the second coil conductor 12 formed continuously has been described. Alternatively, these may be formed by connecting and joining segment coils divided in the circumferential direction X. Ends of the segment coils are joined via portions extending from the end surfaces in the axial direction Z of the stator core 1.

Figure 12:
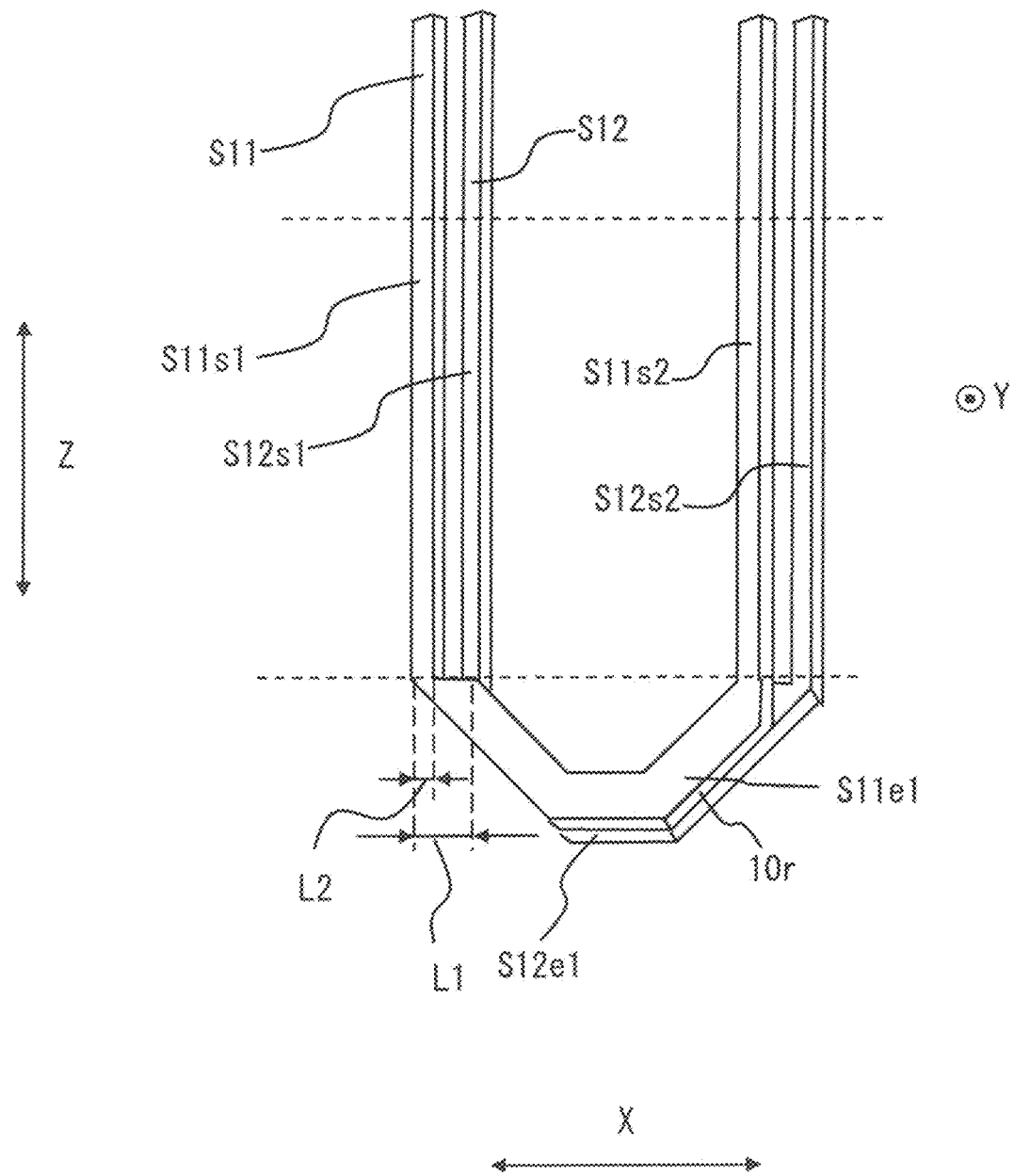
FIG. 12 is a perspective view of a stacked segment coil conductor according to embodiment 3.

FIG. 12 is a perspective view of a stacked segment coil conductor S10.

The stacked segment coil conductor S10 is composed of a first segment coil conductor S11 and a second segment coil conductor S12. A slot insert portion S11s1 and a slot insert portion S11s2 of the first segment coil conductor S11 are continuously connected via a coil end portion S11e1 of which a width L1 in the circumferential direction X is greater than a width L2 in the circumferential direction X of the slot insert portion S12s1 and the slot insert portion S11s2. Similarly, a slot insert portion S12s1 and a slot insert portion S12s2 of the second segment coil conductor S12 are continuously connected via a coil end portion S12e1 of which a width L1 in the circumferential direction X is greater than a width L2 in the circumferential direction X of the slot insert portion S12s1 and the slot insert portion S12s2. The first segment coil conductor S11 and the second segment coil conductor S12 are stacked in the radial direction Y with an insulator 10r therebetween.

Figure 13:
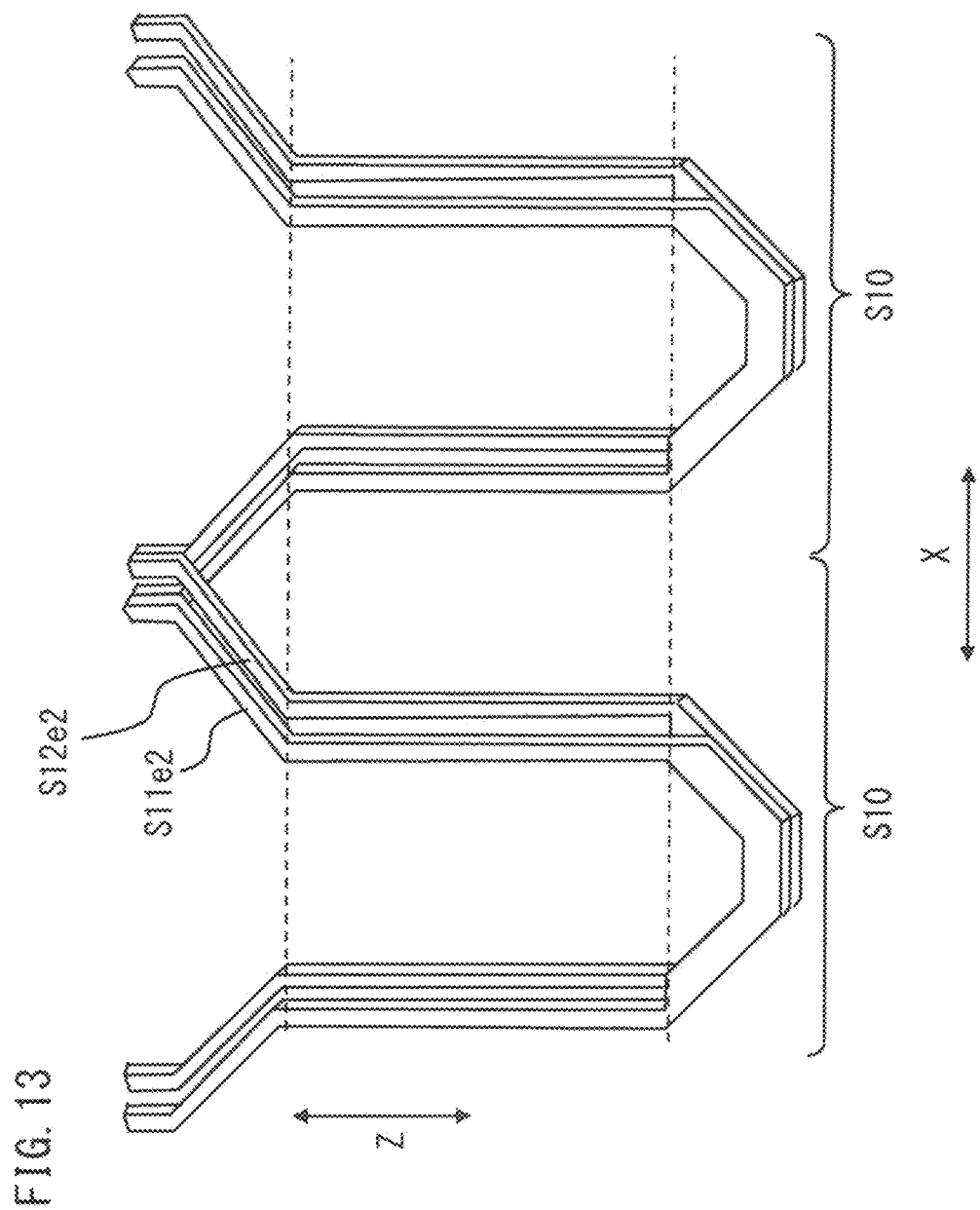
FIG. 13 shows a connection state between stacked segment coil conductors according to embodiment 3.

FIG. 13 shows a connection state between the stacked segment coil conductors S10.

A part protruding in the axial direction Z from the slot S is bent and connected to the adjacent stacked segment coil conductor S10, thus forming a coil end portion S11e2 and a coil end portion S12e2. In this way, a coil to be mounted the same slots Sn as those for the above-described stacked coil conductor 10A obtained.

Also for the parts forming the coil end portion S11e2 and the portion S12e2 connecting the stacked segment coil conductors S10 adjacent to each other, the widths the circumferential direction X may be greater than the widths in the circumferential direction X of the slot insert portions.

FIG. 14 is a schematic sectional view showing the structure of a stator 50B to which the stator coil 100 formed by combining a plurality of stacked segment coil conductors S10 is mounted.

As shown in FIG. 14, the plurality of stacked segment coil conductors S10 may be stacked in the radial direction Y with a continuous insulator 10r therebetween so that the plurality of stacked segment coil conductors S10 are integrated.

The stator coil and the rotating electric machine stator according to embodiment 3 provide the same effects as those in embodiment 1.

Although the disclosure is described above in terms of various exemplary embodiments and implementations, it should be understood that the various features, aspects, and functionality described in one or more of the individual embodiments are not limited in their applicability to the particular embodiment with which they are described, but stead can be applied, alone or in various combinations one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1B stator core
1a yoke portion
1b tooth portion
100 stator coil
100A coil group
10A, 10B, 10C stacked coil conductor
S10 stacked segment coil conductor
10Ae1, 10Ae2, 10Be2, 10Ce2 stacked coli end portion
10r insulator
11, 11A, 11B, 11C, 11D first coil conductor
S11 first segment coil conductor
11Ae, 11Be, 11Ce, 11De winding finish end
11As, 11Bs, 11Cs, 11Ds winding start end
11AT1, 11AT2, 11BT1, 11BT2 cut portion
11e1, 11e2, 12e1, 12e2, S11e1, S11e2, S12e1, S12e2 coil end portion
11s1, 11s2, 12s1, 12s2, S11s1, S11s3, S12s1, S12s2 slot insert portion
12 second coil conductor
S12 second segment co L conductor
4A to 4D combination coil
50, 50B stator
N neutral point
O lead-out wire
S slot
SP pitch
X circumferential direction
Y radial direction
Z axial direction

The invention claimed is:

1. A stator coil to be mounted to a rotating electric machine stator core including an annular yoke portion, a plurality of tooth portions protruding inward in a radial direction from an inner circumferential surface of the yoke portion and arranged at regular intervals in a circumferential direction, and a plurality of slots formed between the tooth portions adjacent to each other, the stator coil comprising a plurality of coil conductors, wherein
a thickness in the radial direction at a coil end portion of each coil conductor provided on at least one end surface side in an axial direction of the stator core is equal to a thickness in the radial direction of a slot insert portion of the coil conductor to be inserted into the slot of the stator core,
a width in the circumferential direction of each coil conductor at an end in the circumferential direction of the coil end portion is greater than a width in the circumferential direction of the coil conductor at the slot insert portion,
the coil conductors include two kinds of coil conductors:
a first coil conductor including a plurality of the slot insert portions to be inserted into the slots of the stator core that are away from each other by a predetermined number of slots, and a plurality of the coil end portions continuously connecting ends in the axial direction of the slot insert portions alternately on one end side and another end side in the axial direction of the stator core; and
a second coil conductor including a plurality of the slot insert portions to be inserted into the slots of the stator core that are away from each other by a predetermined number of slots, and a plurality of the coil end portions continuously connecting ends in the axial direction of the slot insert portions alternately on one end side and another end side in the axial direction of the stator core,
the first coil conductor and the second coil conductor are stacked in the radial direction, to form a stacked coil conductor, and
a center part in the circumferential direction of the coil end portion of the first coil conductor and a center part in the circumferential direction of the coil end portion of the second coil conductor overlap each other as seen in the radial direction.

2. The stator coil according to claim 1, wherein the slots into which the slot insert portions of the first coil conductor are to be inserted and the slots into which the slot insert portions of the second coil conductor are to be inserted, are shifted from each other by one slot toward one side in the circumferential direction.

3. The stator coil according to claim 2, wherein a width in the circumferential direction of the first coil conductor at one end in the circumferential direction of the coil end portion of the first coil conductor, and a width in the circumferential direction of the second coil conductor at another end in the circumferential direction of the coil end portion of the second coil conductor, are each equal to a sum of a pitch in the circumferential direction of the slots and the width in the circumferential direction of the slot insert portion.

4. The stator coil according to claim 2, comprising a combination coil including three of the stacked coil conductors, wherein
the slots into which the slot insert portions of a first stacked coil conductor are to be inserted and the slots into which the slot insert portions of a second stacked coil conductor are to be inserted, are away from each other by two slots toward one side in the circumferential direction, and
the slots into which the slot insert portions of the second stacked coil conductor are to be inserted and the slots into which the slot insert portions of a third stacked coil conductor are to be inserted, are away from each other by two slots toward one side in the circumferential direction.

5. The stator coil according to claim 4, wherein positions in the radial direction in the slots into which the slot insert portions of the first coil conductor composing the first stacked coil conductor are to be inserted, positions in the radial direction in the slots into which the slot insert portions of the first coil conductor composing the second stacked coil conductor are to be inserted, and positions in the radial direction in the slots into which the slot insert portions of the first coil conductor composing the third stacked coil conductor are to be inserted, are all the same.

6. The stator coil according to claim 5, comprising a plurality of the combination coils.

7. The stator coil according to claim 2, wherein
the stacked coil conductor is composed of a plurality of stacked segment coil conductors divided in the circumferential direction.

8. The stator coil according to claim 1, wherein
a width in the circumferential direction of the first coil conductor at one end in the circumferential direction of the coil end portion of the first coil conductor, and a width in the circumferential direction of the second coil conductor at another end in the circumferential direction of the coil end portion of the second coil conductor, are each equal to a sum of a pitch in the circumferential direction of the slots and the width in the circumferential direction of the slot insert portion.

9. The stator coil according to claim 8, comprising a combination coil including three of the stacked coil conductors, wherein
the slots into which the slot insert portions of a first stacked coil conductor are to be inserted and the slots into which the slot insert portions of a second stacked coil conductor are to be inserted, are away from each other by two slots toward one side in the circumferential direction, and
the slots into which the slot insert portions of the second stacked coil conductor are to be inserted and the slots into which the slot insert portions of a third stacked coil conductor are to be inserted, are away from each other by two slots toward one side in the circumferential direction.

10. The stator coil according to claim 9, wherein
positions in the radial direction in the slots into which the slot insert portions of the first coil conductor composing the first stacked coil conductor are to be inserted, positions in the radial direction in the slots into which the slot insert portions of the first coil conductor composing the second stacked coil conductor are to be inserted, and positions in the radial direction in the slots into which the slot insert portions of the first coil conductor composing the third stacked coil conductor are to be inserted, are all the same.

11. The stator coil according to claim 10, comprising a plurality of the combination coils.

12. The stator coil according to claim 8, wherein
the stacked coil conductor is composed of a plurality of stacked segment coil conductors divided in the circumferential direction.

13. The stator coil according to claim 1, comprising a combination coil including three of the stacked coil conductors, wherein
the slots into which the slot insert portions of a first stacked coil conductor are to be inserted and the slots into which the slot insert portions of a second stacked coil conductor are to be inserted, are away from each other by two slots toward one side in the circumferential direction, and
the slots into which the slot insert portions of the second stacked coil conductor are to be inserted and the slots into which the slot insert portions of a third stacked coil conductor are to be inserted, are away from each other by two slots toward one side in the circumferential direction.

14. The stator coil according to claim 13, wherein
positions in the radial direction in the slots into which the slot insert portions of the first coil conductor composing the first stacked coil conductor are to be inserted, positions in the radial direction in the slots into which the slot insert portions of the first coil conductor composing the second stacked coil conductor are to be inserted, and positions in the radial direction in the slots into which the slot insert portions of the first coil conductor composing the third stacked coil conductor are to be inserted, are all the same.

15. The stator coil according to claim 14, comprising a plurality of the combination coils.

16. The stator coil according to claim 13, comprising a plurality of the combination coils.

17. The stator coil according to claim 13, wherein
the stacked coil conductor is composed of a plurality of stacked segment coil conductors divided in the circumferential direction.

18. The stator coil according to claim 1, wherein
the stacked coil conductor is composed of a plurality of stacked segment coil conductors divided in the circumferential direction.

19. The stator coil according to claim 1, wherein
the coil end portions are bent in the radial direction.

20. A rotating electric machine stator comprising:
a rotating electric machine stator core including an annular yoke portion, a plurality of tooth portions protruding inward in a radial direction from an inner circumferential surface of the yoke portion and arranged at regular intervals in a circumferential direction, and a plurality of slots formed between the tooth portions adjacent to each other; and
the stator coil according to claim 1.

* * * * *